US012722295B2

(12) United States Patent
Janssen et al.

(10) Patent No.: US 12,722,295 B2
(45) Date of Patent: Sep. 1, 2026

(54) AUTOMATED BATTERY DISASSEMBLY

(71) Applicant: Universe Energy, Inc., El Segundo, CA (US)

(72) Inventors: Wiebe Janssen, Venice, CA (US); Raymond Ruoqin Ma, Gardena, CA (US)

(73) Assignee: Universe Energy, Inc., El Segundo, CA (US)

( * ) Notice: Subject to any disclaimer, the term of this patent is extended or adjusted under 35 U.S.C. 154(b) by 55 days.

(21) Appl. No.: 19/003,729

(22) Filed: Dec. 27, 2024

(65) Prior Publication Data

US 2025/0214238 A1 Jul. 3, 2025

Related U.S. Application Data

(60) Provisional application No. 63/616,407, filed on Dec. 29, 2023.

(51) Int. Cl.
*B25J 9/16* (2006.01)

(52) U.S. Cl.
CPC ........... *B25J 9/1664* (2013.01); *B25J 9/1694* (2013.01)

(58) Field of Classification Search
CPC . B25J 9/16; B25J 9/1661; B25J 9/1664; B25J 9/1694; B25J 9/1697; G05B 2219/37431; G05B 2219/40395; G05B 2219/40487
USPC .................................................. 700/245–264
See application file for complete search history.

(56) References Cited

U.S. PATENT DOCUMENTS

| | | | | |
|---|---|---|---|---|
| 11,051,441 | B1 * | 6/2021 | Wieler | H05K 13/0486 |
| 11,157,043 | B1 * | 10/2021 | Rujanavech | G06F 1/1635 |
| 12,034,133 | B1 * | 7/2024 | Kim | H01M 6/52 |
| 12,263,547 | B2 * | 4/2025 | Srikanth | B23P 19/04 |
| 12,420,357 | B2 * | 9/2025 | Kohll | H01M 10/54 |
| 2022/0089237 | A1 * | 3/2022 | Sverdlov | B25J 9/1697 |
| 2024/0391038 | A1 * | 11/2024 | Srikanth | B23P 19/04 |

FOREIGN PATENT DOCUMENTS

| | | | | |
|---|---|---|---|---|
| CA | 3211707 A1 * | 11/2023 | | H01M 10/44 |
| EP | 4592038 A1 * | 7/2025 | | H01M 10/0404 |

* cited by examiner

*Primary Examiner* — Jonathan L Sample
(74) *Attorney, Agent, or Firm* — Cognition IP, P.C.; Edward Steakley; Saleh Kaihani

(57) ABSTRACT

Batteries can be disassembled using robotics. One or more robotic agents can use the output of a suite of sensors to identify a battery type, and follow a set of disassembly instructions to disassemble a battery. The set of disassembly battery instructions can include a series of tasks primitives, where each task primitive is a selection of a tool, a motion trajectory for the tool and a disassembly task performable on a battery feature. In some embodiments, the disassembly instructions and/or the task primitives can be constructed from observing the output of sensors attached to the tools operated by a human technician and/or the human technician body. During the disassembly, the prestored task primitives can be modified to better fit the conditions of the battery.

20 Claims, 9 Drawing Sheets

700

702

Tool State Perception Suite

704 Onboard Vision Cameras

706 Proximity Range Sensors

708 Environmental Motion Tracking Sensors

710 IMU

712 Exploratory Probing Motions Module

714 Sensor Fusion

716 Tool State Estimation

AUTOMATED BATTERY DISASSEMBLY

CROSS-REFERENCE TO RELATED APPLICATIONS

This application claims the benefit of priority to U.S. Provisional Application No. 63/616,407, filed on Dec. 29, 2023, and titled "AUTOMATED BATTERY DISASSEMBLY," which is hereby incorporated by reference in its entirety.

BACKGROUND

Field

This invention relates generally to the field of secondary storage devices and robotics, and more particularly, to systems and methods for robotic disassembly of secondary storage devices.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Secondary batteries contain valuable resources and material that can be recycled and reused in a variety of ways. The secondary batteries, used in electrical vehicles (EVs) and hybrid electrical vehicles (HEV), can be recycled and reassembled into the same or similar EV or HEV batteries, used as grid storage devices, or turned back into raw material for use in batteries or other applications. Depending on the state of health (SOH) of a battery, a particular reuse or recycle strategy for the battery can be implemented. Sometimes a portion of a battery can be reused in a rather demanding application if that portion is relatively free of degradation, while another battery portion is recycled or reused in less demanding applications. Consequently, disassembly and state of health analysis are important steps in the life cycle of secondary batteries.

Manual disassembly of secondary batteries can be performed. Often trained technicians, observing stringent safety protocols perform the manual disassembly. Acquiring the necessary training can be challenging. Several variations of secondary batteries exist, some without easily accessible manufacturer disassembly instructions, or battery architectural diagrams. Consequently, it can be difficult for human technicians to accumulate the necessary knowledge and disassembly know-how for the disparate battery types.

Furthermore, in many prevalent applications of secondary batteries, such as in EV and HEV applications, technicians are potentially exposed to high voltages and currents, making the task, particularly, dangerous to humans. The task is made more dangerous, as in many battery types, clean disassembly may not have been envisioned by the manufacturers. Some steps in the disassembly can be destructive, for example, requiring detaching battery portions that are glued, or welded, as opposed to being fastened using fasteners, screws or bolts. Performing destructive disassembly, as may be required for several battery types, can be particularly, perilous to human technicians.

To reduce the risk of electrocution, batteries can be discharged before disassembly. However, assessing the state of health of a battery may require the batteries and the battery cells to be charged. Many methods of assessing state of health of batteries perform power cycling on battery cells, using one or more onboard battery management systems (BMS) that are only usually accessible, when at least some disassembly is performed to gain access the to the BMS modules. In addition, charging and discharging the battery cells to accommodate both the human safety protocols and to perform SOH analysis can be time-consuming, making the disassembly slow and less economical to perform. For example, in some cases, charging and discharging an EV or HEV battery can take in excess of 30 hours.

Some battery disassembly tasks also require dexterity, while safety requires the human technicians to wear protective gear, making the performance of such tasks challenging, or more time-consuming.

These and other challenges of the manual disassembly of secondary batteries can be addressed by performing the assembly, autonomously, or semi-autonomously, using robotic technology. Additionally, autonomous, or semi-autonomous battery disassembly can confer several benefits that would not otherwise be available with manual disassembly processes. Several of these benefits can become evident in relation to the described embodiments.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

DETAILED DESCRIPTION

Figure 1:
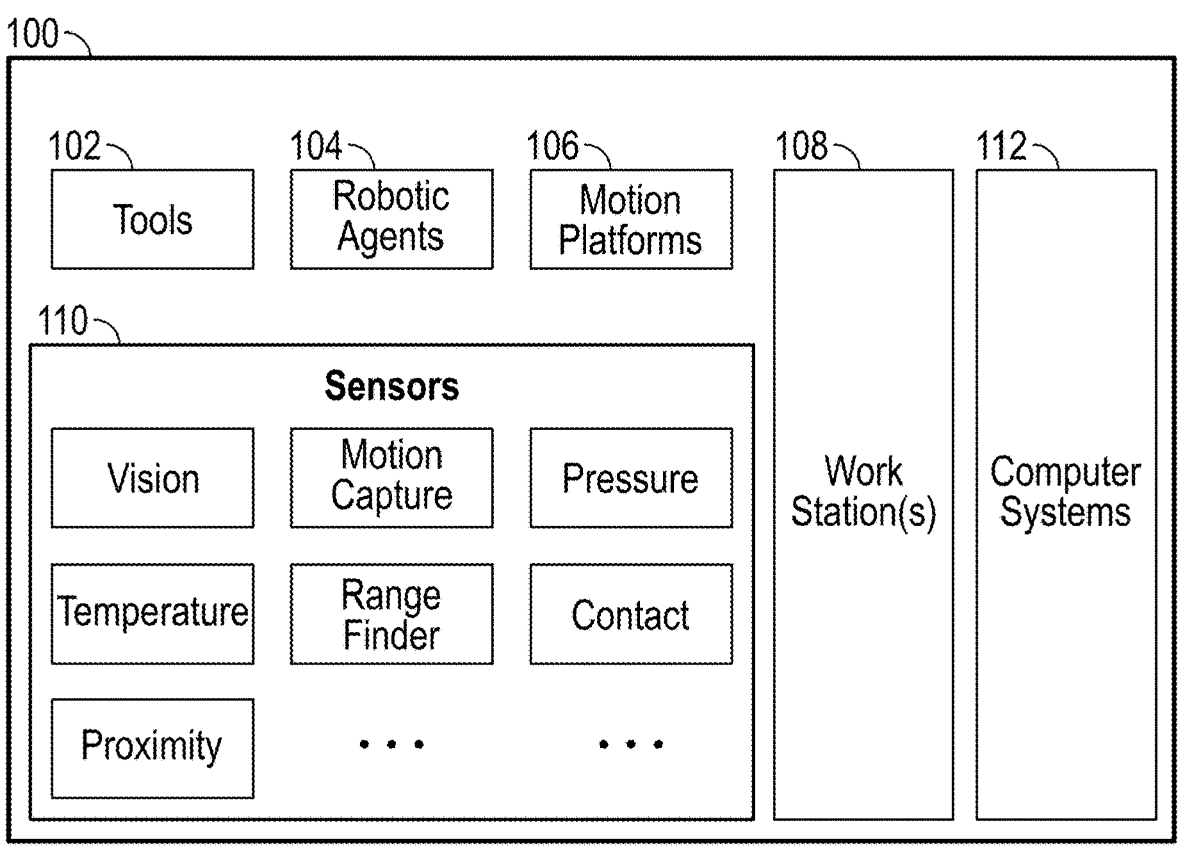
FIG. 1 illustrates a block diagram of an automated battery disassembly system (ABDS) according to an embodiment.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Many modern industries have utilized secondary batteries to deliver products and services to consumers. Electric vehicles and hybrid vehicles, in particular, have widely adopted and popularized the use of secondary batteries in modern vehicles. However, the adoption of secondary battery technologies has presented new challenges, including economical and environmental challenges. The materials used in building secondary batteries are difficult to mine and often present a substantial environmental cost to acquire and transform into secondary batteries. As such, modern manufacturers, and various industries using secondary batteries, search for ways to repair, recycle, or otherwise reuse secondary batteries, to mitigate the negative financial and environmental impact of using secondary battery technology.

Secondary batteries, such as those used in hybrid vehicles (HEVs), or electric vehicles (EVs), can find additional uses after their initial deployment, based on their state of health (SOH) after a period of use. Some secondary batteries, that are free of major damage, can be repaired, for example, by replacing damaged or worn-out cells, and reused in the same or similar function, as in their prior deployments. Not all, but various secondary battery architectures can allow for repair and redeployment of a secondary battery that has been used for some period of time in an HEV or an EV. For example, some battery architectures include modules of cells, where damaged cells, or damaged modules, can be replaced if the remaining cells or modules meet a particular use-case specification. Some secondary batteries might have a degraded state of health, but nevertheless, they can still meet operating specifications for a less demanding use case. For example, degraded, but functional secondary batteries, can find a second life as grid storage batteries. Grid storage batteries can be used in electrical distribution systems for storing electrical energy. Some secondary batteries are, however, not suitable for repurposing. These secondary batteries can be recycled to their raw materials, using various techniques, including for example, chemical separation processes. In short, a secondary battery after a reasonable lifetime of use in an application or an industry, can be repaired and reused in the same industry for the same function, or repurposed in another industry for another function, or recycled into raw materials. In order to diagnose, repair, or repurpose a secondary battery, the battery may need to be disassembled.

Challenges of Battery Disassembly

Repairing, repurposing or recycling of a secondary battery all include at least some disassembly or may include performing diagnostics to determine which lifecycle pathway is more suitable for the state of a secondary battery. Secondary battery disassembly, particularly, in the case of large secondary batteries, such as those used in HEVs and EVs, is a demanding task, presenting substantial technical and safety challenges. For example, the disassembly of large secondary batteries can often require discharging high voltage battery cells, which can be dangerous to human technicians if not performed under stringent safety protocols. Assessing the state of health of a battery can require cycling the battery through multiple charge and discharge cycles, where each power cycle can take in excess of thirty hours to complete, when the safety protocols are observed. Additionally, numerous types and models of large secondary batteries, for which performing disassembly is economical, exist. While disassembly can include performing common tasks between different battery types, disassembly can also include substantial variations between different battery types and models. Human technicians, faced with myriad of battery types and models can be disadvantaged in battery identification and application of a correct disassembly procedure for a particular battery type.

For some secondary batteries, disassembly documentation, such as layout or disassembly manuals, can be nonexistent or not easily procurable, making the battery disassembly more difficult to perform. Another disassembly challenge is that in many cases, a specific set of disassembly tasks may need to be performed, without skipping steps to ensure proper or optimum disassembly. For example, for some batteries, all wiring must be removed before attempting to remove cells and/or modules. If any wires are left, the affected cell or module can become entangled in the wires, causing damage to the cells, or presenting safety hazards. Technicians performing manual disassembly can be at a disadvantage in terms of ensuring proper disassembly tasks in the proper order have been performed. Another disassembly challenge for large secondary batteries can reside in the large size of such batteries, often requiring human technicians to utilize winches and/or heavy-duty equipment, sometimes presenting an efficiency or safety challenge for the disassembly. Consequently, the battery industry can substantially benefit from autonomous or semi-autonomous battery disassembly technology.

FIG. 1 illustrates a block diagram of an automated battery disassembly system (ABDS) 100 according to an embodiment. The ABDS 100 can include tools 102, which can be housed in a cache of tools. The tools 102 can be the same or similar tools to those used in manual battery disassembly. Examples include cutting tools, lifting tools, screwdriver tools, pinchers, winches, and any other tool or tool functionality that may be used in disassembly of a battery. The ABDS 100 further includes robotic agents 104. The robotic agents 104 can include both robotic and cobotic devices. Cobotic devices refer to collaborative robotic agents that perform their function with assistance from a human operator. The robotic agents 104 can include robotic arms, which can be coupled with a tool 102. The ABDS 100 can also include one or more motion platforms 106. The motion platforms 106 can move the robotic agents 104 from one location to another. Alternatively, or in addition, the motion platforms can move a battery to a tool and/or a robotic agent. The ABDS 100 can also include one or more workstations 108, which can be used to secure a battery for disassembly operations. The workstations 108 can be coupled with the robotic agents 104, and/or the motion platforms 106. In other embodiments, the workstations 108 can be independent of the robotic agents 104 and/or the motion platforms 106. Both the robotic agents 104 and workstations 108 can be stationary or mobile depending on the implementation of the ABDS 100. The ABDS 100 can also include the sensors 110. Some examples of the sensors 110 can include vision sensors, motion capture sensors, pressure sensors, temperature sensors, range finders, depth sensors, contact detection sensors, proximity sensors, accelerometers, and other sensors. One or more computer systems 112 can be used to provide software functionality for the ABDS 100.

Figure 2:
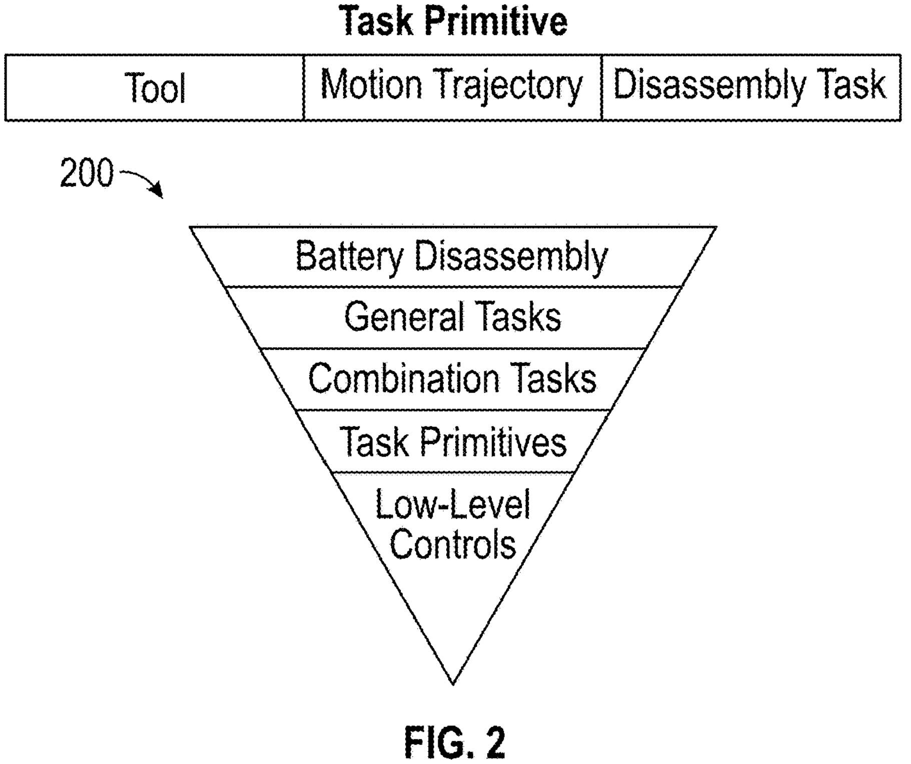
FIG. 2 illustrates a diagram of an automated battery disassembly strategy, implemented in one or more embodiments.

FIG. 2 illustrates a diagram of an automated battery disassembly strategy, implemented in one or more embodiments. A battery disassembly task can be broken down into a hierarchy of progressively smaller tasks presented in the form of a funnel 200. A battery disassembly task can be broken down into a series of general battery disassembly tasks. The general battery disassembly tasks can in turn be broken down into combination tasks. Each combination task can be broken down into a series of task primitives.

Task Primitive

Autonomous battery disassembly can be performed by a series of tool motions, performing disassembly tasks on target features on a battery, where the location, pose or state of the target feature and/or the tool are estimated or determined by querying the sensors 110, or receiving a broadcast from the sensors 110. In this context, a task primitive can include a tool, a series of motion trajectories to move the tool to a battery feature, and a disassembly task performed on the target feature. The performance of a disassembly task can include receiving a series of commands, by a robotic agent and/or a robot-augmented tool. An example of a task primitive is, "tool"="cutting tool," "motion trajectory is to move from position (x, y, z) to position (m, n, p)," where position (x, y, z) is where the tool is currently located, and the position (m, n, p) is where the battery feature is located, and "task performance"="exert 5 lbs. per square inch of pressure using the cutting tool." Some disassembly tasks include performance of two or more task primitives in parallel. In other words, task primitives can be linked in parallel, where the performance of one task primitive triggers the parallel performance of another task primitive. On the other hand, some battery disassembly tasks can include simultaneous performance of two or more task primitives in parallel. For example, cutting the external frame of some batteries may include one task primitives for one or more robotic agent arms to brace or secure the battery, or the battery frame, and for another robotic agent, armed with a cutting tool, to cut the frame.

Low-Level Controls

Task primitives can be translated into a series of low-level controls and commands that can be inputted into the robotic agents 104, tools 102, motion platforms 106, and/or workstations 108 to perform the task primitive. Additional details of low-level controls will be described in relation to the embodiment of FIG. 4.

Example Method of Autonomous Battery Disassembly

Figure 3:
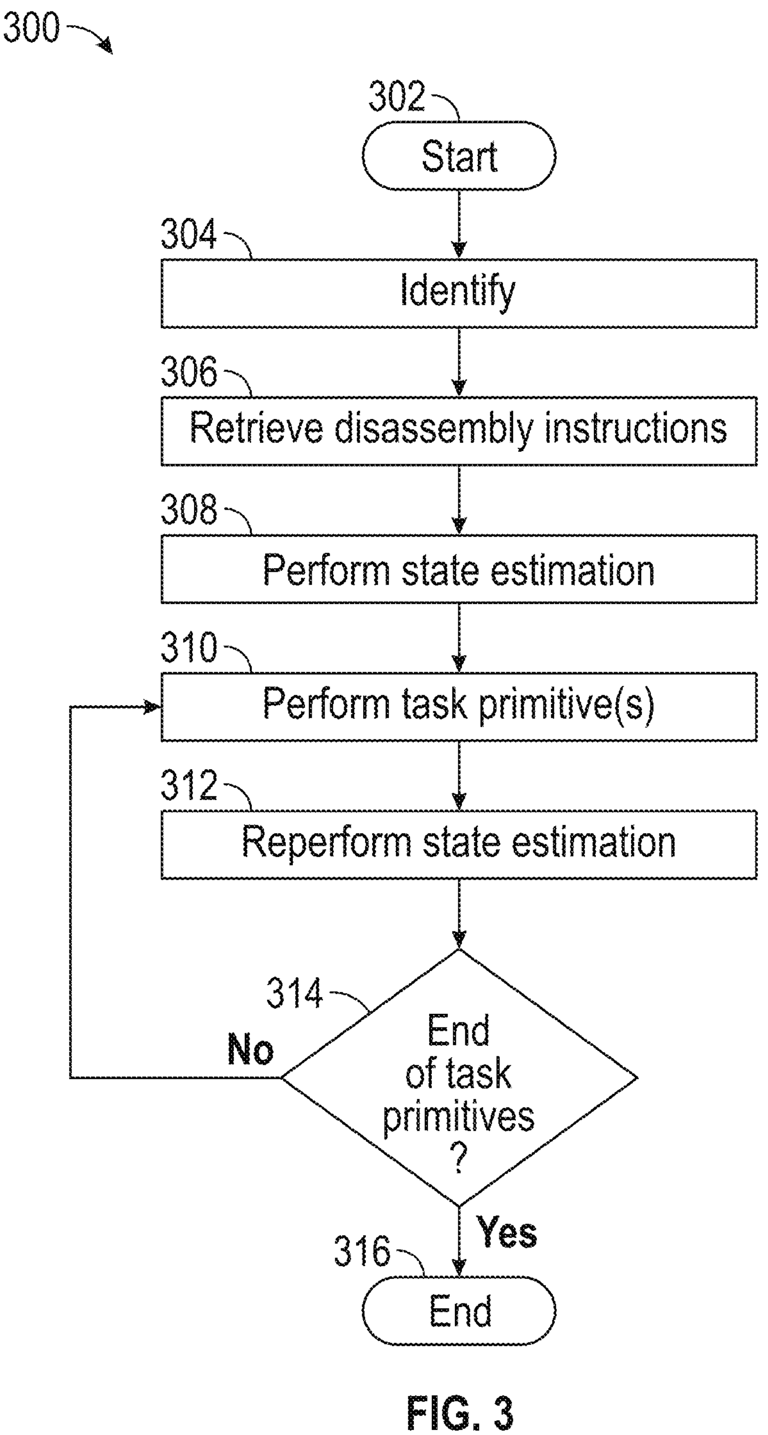
FIG. 3 illustrates a flowchart of an example method of autonomous battery disassembly.

FIG. 3 illustrates a flowchart of an example method 300 of autonomous battery disassembly. The method starts at step 302. At step 304, the type of a battery can be determined. Input from various vision sensors can be used to determine the type of battery. For example, the vision sensors can scan text, labels, barcodes, or other visually identifying information to determine battery type. In some embodiments, unique or identifying features of the batteries can be used to determine battery type. For example, a unique shape of a cover lid, or a unique shape of a battery compartment can be used to identify a battery type.

At step 306, based on the identified battery type, a set of disassembly instructions can be retrieved. Disassembly instructions can include a series of task primitives to accomplish battery disassembly. At step 308, the state of the universe of the battery disassembly environment is estimated. State estimation at step 308 can include estimating the location of the battery relative to one or more robotic agents 104. Estimating, querying, or otherwise determining the location of the battery, the tools 102, one or more robotic agents 104, motion platforms 106, and one or more workstations 108, relative to one another or relative to a reference point can be a part of the state estimation performed at step 308. The location estimation can be made easier when the battery is secured in a platform with hard stops, whose locations, relative to various robotic agents 104 are known. In other words, hard stops, securing a battery in a workstation 108 can be used as reference points for the vision sensors to estimate the location of a battery and/or battery features, relative to robotic agents 104. In some embodiments, point cloud data can be used to estimate the location of a battery, relative to the robotic agents 104. Point cloud data can include data returned by red, green, blue, depth (RBGD) vision sensors. Point cloud data can include RBG data, as well as cartesian coordinates (e.g., X, Y, and Z, relative to a reference point). State estimation can also include determining success or failures of any prior task primitives that may be related to or required for the performance of a subsequent task primitive.

At step 310, one or more task primitives, from the series of task primitives, retrieved at step 306 are performed. Performing a task primitive can include selecting a tool associated with the task primitive, locating a target feature associated with the task primitive, moving the tool and/or the robotic agent to the target feature, and performing the disassembly task associated with the task primitive, by operating the tool on the target feature.

In some embodiments, selecting the tool at step 310 can include moving a robotic agent 104 to a cache of tool 102, depositing a prior active tool, and loading and/or arming the robotic agent 104 with a new tool 102, associated with a new task primitive. Locating a target feature associated with the task primitive can include querying the vision sensors, filtering noise, or outliner data, and calculating locations of the target feature and the selected tool, relative to one another, or relative to another reference point.

Moving a tool 102 to a target battery feature can include planning a collision free motion trajectory between the two, and actuating motion platforms 106, the robotic agent 104, and/or the tool 102, to execute the planned motion trajectory. In some embodiments, state estimation and/or location estimation can be reperformed, to refine the estimated locations and improve the likelihood of the tool 102 successfully moving to a target feature.

Step 310 further includes operating the selected tool on the target feature, performing the disassembly task embedded in a task primitive. Below, some examples of task primitives performed at step 310 are described.

For a task primitive directed to unscrewing a fastener, where the target feature is a fastener, selecting a tool can include swapping a prior active tool to an impact wrench with sockets matching the target fastener. Localizing the target feature can include estimating the location of the fastener relative to motion platform 106 coordinate frame. Moving to the target feature can include moving the tool armed with impact wrench to the socket above the target fastener head, parallel to the target fastener plate plane. Operating the tool can include engaging the fastener head with the socket and unscrewing the target fastener. In some cases, the tooling may have additional compliant elements to passively help engage the socket to the target fastener head.

For a task primitive directed to cutting a top lid, the target feature can be a contour cutting path on the top lid panel of the battery. Selecting a tool can include swapping from a prior active tool to an angle grinder or a cutting wheel. Localizing the target feature can include detecting the overall battery pack shape and locating a starting point of a selected contour cutting path. Moving the tool to the target feature can include moving the cutting tool to the starting point of the contour cutting path. Operating the tool can include turning the cutting tool ON and moving the cutting tool through the contour cutting path.

For a task primitive directed to de-connectorizing a harness, the target feature is the harness and the connector tabs coupled with the harness. Selecting a tool can include swapping a prior active tool to a specialized end-effector tool for de-connectorizing. Localizing the target feature can include estimating the location of the harness connector and the relevant release-tabs. Moving the tool to the target feature can include moving the tool to close proximity of a connector and orienting the tool, such that the tabs are accessible to the tool. Operating the tool can include engaging the tool with the connector tabs, depressing the tabs, and pulling the connector outwards. In this scenario, the specialized connector can be designed to depress the tabs and disengage the connector.

For a task primitive directed to moving a harness out of the workspace of another task primitive, the target feature is a grasping location on the harness, for example, near a connector of a harness. Selecting a tool can include swapping a prior active tool for a gripper tool. Localizing the target feature can include finding the harness cable and the connector at or near the grasping location on the harness. Moving the tool to the target feature can include moving the gripper tool to the grasping location on the harness near the connector. Operating the tool can include grasping the harness cable body near connector at the grasping location and moving the harness out of the workspace of another task primitive.

At step 312, state estimation, as described in relation to step 308 is reperformed, including determining whether the task primitive performed at step 310 was completed successfully. If a failure is detected, the method can return to step 310 and attempt to reperform the task primitive. Alternatively, or in addition, an alert, or an error message, can be generated. At step 314, it is determined whether the task primitives outlined in the disassembly instructions are exhausted. If yes, the method ends at step 316. If not, the method returns to step 310 to perform another task primitive. In some embodiments, after performing state estimation, a task primitive can be modified. For example, one or more motion trajectories in a task primitive and/or a tool in a task primitive may be dynamically modified, based on the result of state estimation. The modification of a task primitive, and its associated motion trajectories and/or tools can be for optimization (e.g., to use the shortest, or fastest path, or to reduce power consumption), or it may be for avoiding failures (e.g., when an obstacle in the path of a motion trajectory of a task primitive is detected).

Methods of Generating Disassembly Instructions and Task Primitives

Battery disassembly instructions can be generated by a variety of methods. These methods can be combined, and/or used independently to generate battery disassembly instructions for a type of battery. In some embodiments, the battery disassembly instructions can be generated by obtaining original equipment manufacturer (OEM) resources. For example, some OEMs publish disassembly manuals, diagrams, component lists, or other specification documents that can directly or indirectly be used in generating battery disassembly instructions. Another method of generating battery disassembly instructions include simulation, using software models. In other embodiments, disassembly instructions can be manually generated, for example, by generating rule-based commands, where tool selection, and Cartesians motions are inputted into motion platforms 106 and/or robotic agents 104 in the form of a series of inputs to simulate a known battery disassembly task. If the simulation is successful, for example, in accomplishing a disassembly task, the series of inputs and the Cartesians motions are retained to generate battery disassembly instructions and/or the underlying task primitives.

Another method of generating battery disassembly instructions can include attaching tracking sensors, such as motion capture sensor, pressure sensor, and/or other sensors to a tool, or a technician's hands, arms and/or body to record the technician's performance of a disassembly task. The output of the tracking sensors can be recorded and used to generate battery disassembly instructions, and/or the underlying task primitives.

The methods of generating battery disassembly instructions and/or task primitives described above can be updated over time and refined based on the outcome of the performance of previous battery disassembly tasks. For example, the output of state estimation can be used to tune the disassembly instructions, and/or the task primitives.

Software Architecture

An ABDS can include a variety of disparate hardware and software systems, obtained from third-party vendors, and/or developed natively in the environment of ABDS. In some embodiments, a robotic operating system (ROS) can act as the interface and communication portal between disparate system parts.

Figure 4:
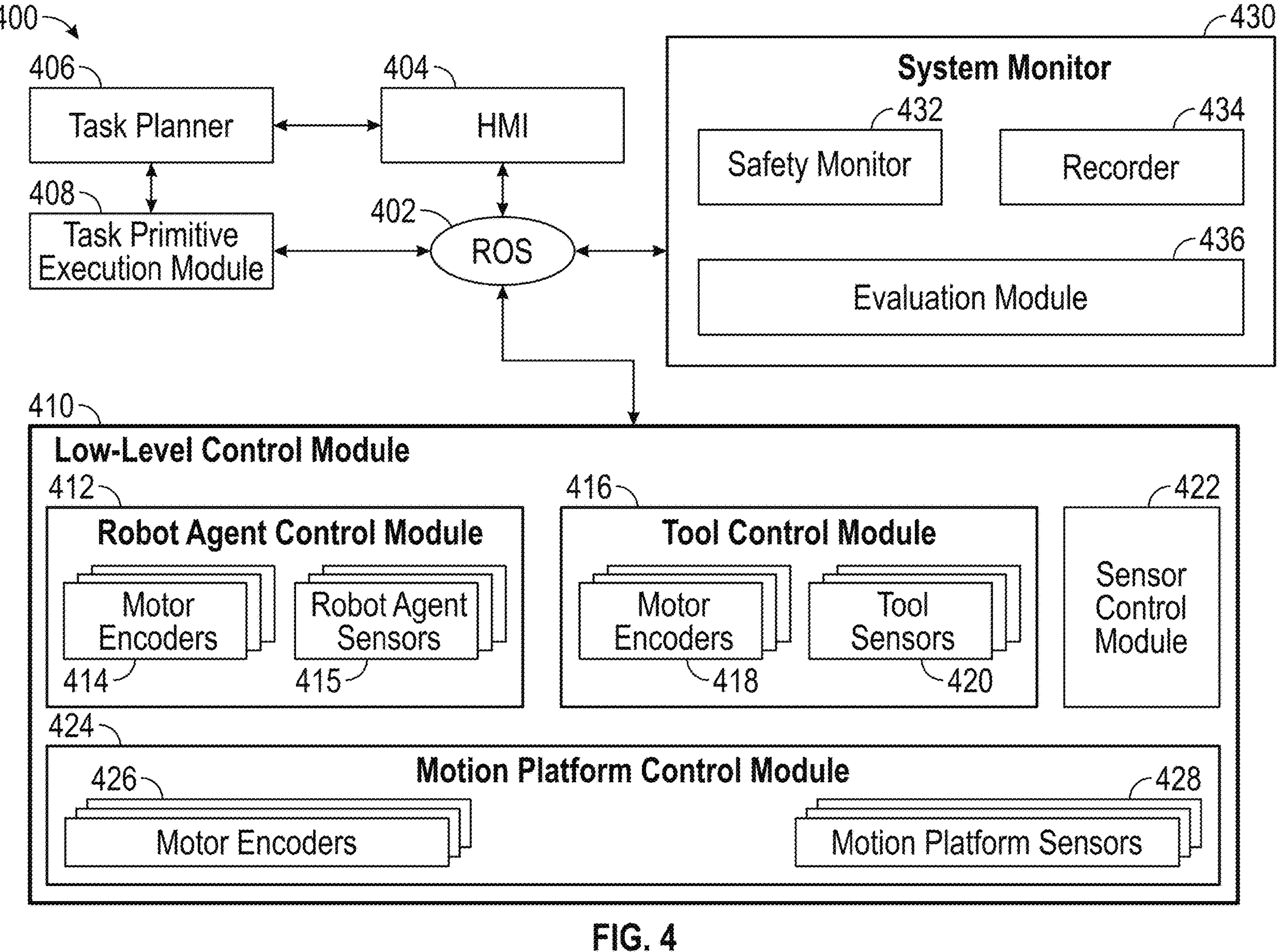
FIG. 4 illustrates a block diagram of software modules of an example ABDS in one embodiment.

FIG. 4 illustrates a block diagram 400 of software modules of an example ABDS in one embodiment. Various components may be natively developed in the environment of the ABDS or obtained from third-party vendors. The ROS 402 can provide a common interface and communication endpoint between the components. A human technician operator can interface with the ABDS via a human machine interface (HMI) 404. The HMI 404 can include one or more graphical user interfaces (GUIs). A task planner 406 can generate battery disassembly instructions from a database of batteries and/or task primitives. The task planner can interface with a task primitive execution module 408. The task primitive execution module 408 can coordinate the execution of numerous and disparate disassembly tasks embedded in the task primitives, including sequential or parallel execution of the task primitives to achieve successful battery disassembly. The ROS 402 can translate and/or transmit the task primitive execution module 408 commands into a low-level control module 410.

A system monitor 430 can monitor, evaluate and/or record data related to the performance of battery disassembly tasks. In some embodiments, the system monitor 430 includes a safety monitor 432. The safety monitor can detect a variety of conditions that pose a safety concern and can generate appropriate action, whether in the form of generating an alarm and/or shutting down various parts of the ABDS. For example, the safety monitor 432 can detect an unsafe battery temperature, based on temperature sensors output, and generate a corresponding response. For example, detecting unsafe battery temperatures can trigger shutting down the disassembly operations and alerting a human technician. In some embodiments, the ABDS operates or expects to operate in an environment, where humans are not in the near vicinity of the ABDS. If the presence of a human in the near vicinity of the ABDS is detected, the safety monitor 432 can generate a corresponding response, such as producing various visual or auditory alarms via the HMI 404, or other components, and/or shutting off various hardware components of the ABDS.

The system monitor 430 can include a recorder 434. The recorder 434 can record the disassembly operations in various aspects. For example, the recordings can include sensor outputs related to various statuses of robotic agents, tools, and/or battery features. The recordings can be used to better tune or improve the subsequent disassembly instructions and/or the task primitives. In other words, the output of the recorder 434 can contribute to the training of the ABDS. In some embodiments, the recorder 434 can record outputs of all or some low-level control module 410, including the output of tool sensors 420, and sensor control module 422, when a human technician is operating a tool. The recorded data in this manner can be used to generate or tune the task primitives.

The system monitor 430 can include an evaluation module 436, which can query or receive the statuses of the performance of various task primitives and their success or failure. Additionally, the evaluation module 436 can query or receive state or pose data related to the robotic agents, and/or the battery features to assist in determining the success or failure of the performance of a task primitive. The evaluation module 436 receives data from various sensors, including one or more vision sensors. Depending on the output of the evaluation module 436, the task primitive execution module 408 can command a corresponding response, including for example, commanding to reperforming a task primitive, or alerting a human technician.

The low-level control module 410 can include a variety of control modules related to or corresponding to various hardware components, for example, the hardware components described in relation to the embodiment of FIG. 1. For example, a robotic agent 104 can include a robot agent control module 412, and a tool control module 416. The low-level control module 410 can also include a sensor control module 422, a motion platform control module 424, and other control modules depending on the implementation of the ABDS. The illustrated control modules are provided as examples. The described ABDS can be implemented in a variety of hardware and software components, where the illustrated components may be combined and/or broken into additional modules. For example, in some embodiments, the low-level control module 410 may be eliminated and each control module can directly interface with the ROS 402.

Various hardware components that can move or have internal motors can include motor encoders to receive low-level controls directed to controlling the operations of the motors. For example, the robot agent control module 412 can include the motor encoders 414. Similarly, the tool control module 416 can include motor encoders 418. The motion platform control module 424 can include motor encoders 426. Furthermore, some hardware components can include independent on-board and/or independent sensors. For example, the robotic agents 104 can include robot sensors. The onboard sensors can have their corresponding low-level control modules too. For example, the Robot agent control module 412 can have low-level control modules related to onboard robot agent sensors 415. The tool control module 416 can have low-level control modules related to onboard tool sensors 420. The motion platform control module 424 can have low-level control modules related to onboard motion platform sensors 428.

The ABDS can have various offboard sensor systems independent of moving hardware. Examples of offboard sensor systems can include vision, proximity and contact sensors. The low-level control module 422 can include sensor control module 422 directed to offboard sensor systems.

Furthermore, the low-level controls module 410 can receive and/or translate task primitives into action by one or more corresponding hardware components. The flow of information between the low-level control modules and higher-level software components, such as Task planner or the system monitor, is bidirectional. For example, various hardware components can broadcast their status, their pose, or their location through the ROS 402 to the HMI 404, the task primitive execution module 408, and/or the system monitor 430. Alternatively, or in addition the low-level control modules can be polled or queried by the higher-level software components.

Figure 5:
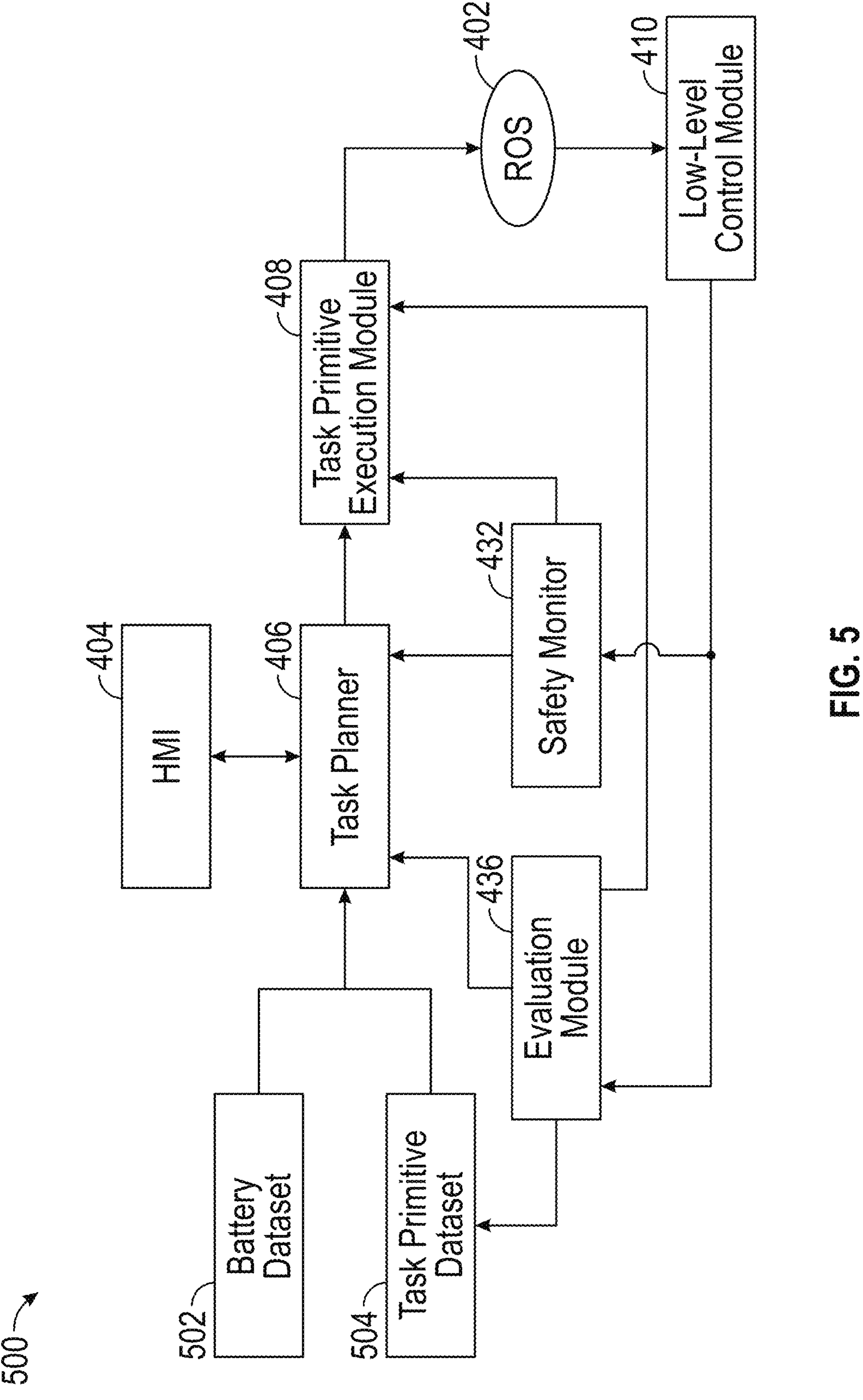
FIG. 5 illustrates a diagram of an alternative implementation of the software architecture of the ABDS.

FIG. 5 illustrates a diagram 500 of an alternative implementation of the software architecture of the ABDS. The task planner 406 can interface with a battery database 502 to obtain various specification documents related to a battery. The battery dataset 502 can include computer diagrams, models, computer aided design (CAD) drawings of a battery architecture, as well as manufacturer documentation on a battery architecture, components, and disassembly. For batteries missing OEM resources, the battery dataset 502 can be developed, based on historical data, obtained from prior disassembly of identical or similar battery types. For a given battery architecture, the task planner 406 can generate battery disassembly instructions from a task primitive dataset 504.

The task primitive dataset 504 can include a library of task primitives. Each task primitive is a combination of a tool, one or more motion trajectories, and an operation of the tool on a battery feature. The task primitive dataset 504 can be generated by a variety of methods, including by monitoring and/or recording a battery disassembly performed by trained technicians, utilizing the same tools associated with the task primitives, attaching sensors to tools and/or gloves worn by technicians to record motion trajectories and quantifiable tool operation parameters, when the human technicians operate a tool on a battery feature. The recorded motion trajectories and tool operations can be used as initial seed data for generating the task primitive dataset 504. The task primitives can also be generated by simulation or modeling, for example, by use of computer aided manufacturing (CAM) techniques. Task primitives can initially be generated by any method as described herein and later be modified or improved, based on monitoring, evaluation, and observation of quantifiable parameters, received from low-level control module 410.

In some embodiments, the recorded data from a human technician, operating a tool on a battery feature, is also augmented with recorded data from other sensors, consequently, recording a state of the ABDS, the battery and the battery feature, which can contribute to the robustness of the task primitives generated from the recorded data. In other words, the recorded state and condition information in combination with the recorded motion trajectories can help inform the generation of a task primitive. In some embodiments, the recorded historical data obtained from recording a technician or from other means can be annotated with task progression milestones. The annotated milestones can be used to evaluate the progression of performance of an assembly task. For example, the evaluation module 436 can use the milestones to determine success or failure of performance of a task primitive.

The task primitive dataset, initially obtained from manual assembly of one battery, can be used in automated disassembly of another battery, whose features and disassembly tasks are similar or compatible. In other words, task primitives can be developed for one battery type and used on other battery types. Task primitives, whose motion trajectories, tools, and actions perform the same function, can be shared among multiple battery types, regardless of the differences that are immaterial to the performance of the disassembly tasks embedded in the task primitives. As an example, a task primitive directed to disconnecting an electrical connector with a quick-release tab, generated, and obtained from one battery, can be stored in the task primitive dataset 504, and used for the disassembly of another battery type. Such task primitives can be shared amongst different battery types, regardless of different connector shapes and sizes because the underlying motion trajectories, tools and tool operations are the same no matter the size and shape of the connector and/or the release tabs. In each instance, the tool operations include the same operations, such as grasping, pulling, or exerting pressure, regardless of the connector shape and size.

The motion trajectories of a task primitive can include more than one category. For example, motion trajectories associated with the movement of a robotic agent, while performing a disassembly task on a battery feature can be labeled as tool-usage trajectories in the task primitive dataset 504. Tool-usage trajectories may be fixed or may have to go through additional steps before being modified. On the other hand, motion trajectories associated with movement of a tool to a battery feature, in preparation or anticipation of performance of a battery disassembly task, can be labeled as free-space motion trajectories, which can be replaced or modified with other motion trajectories. In some embodiments, the task planner 406 and/or the task execution module 408 can modify and/or replace the free-space motion trajectories to generate a collision-free motion trajectory for movement of a robotic agent 104, while maintaining the tool-usage motion trajectories unchanged.

The software architecture of the embodiments of FIGS. 4 and 5 are provided as examples. Persons of ordinary skill in the art can combine and/or modify the described architecture diagrams, without departing from the spirit of the described technology. For example, the functionality of some components can be further divided into additional components. Alternatively, the functionality of some components can be combined, reducing the number of components. Other modifications can also be performed by a person of ordinary skill in the art, without departing from the spirit of the disclosed technology.

Figures 6, 7:
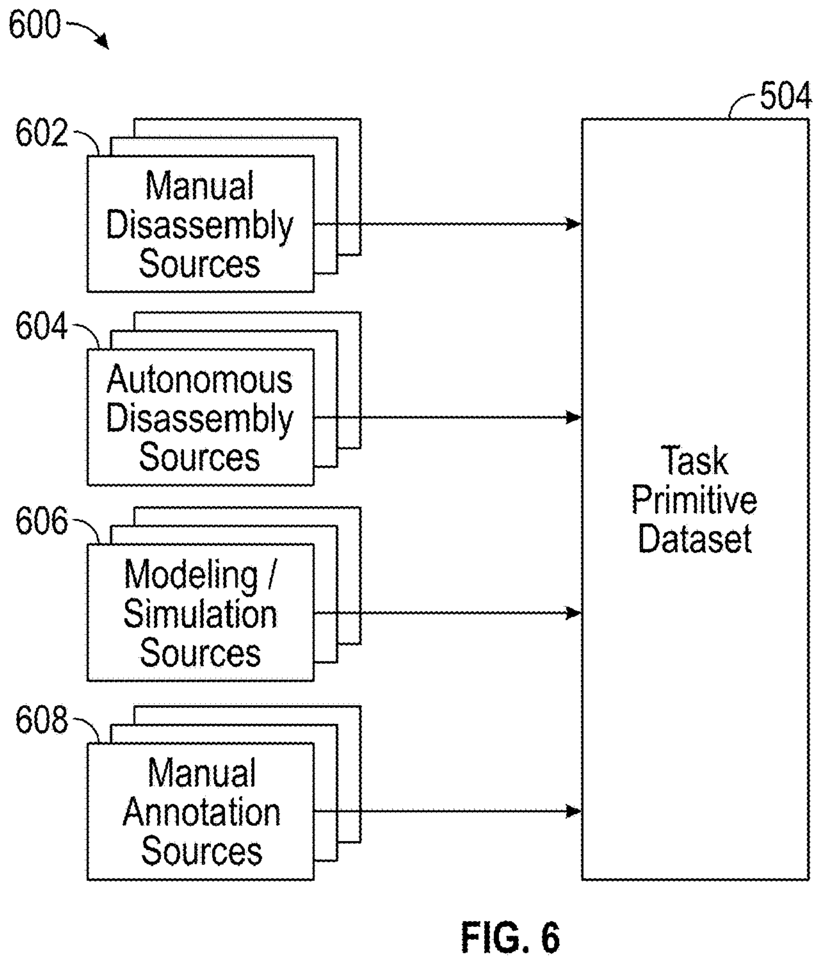
FIG. 6 illustrates a block diagram of an overview of example sources and techniques for generating a task primitive dataset.
FIG. 7 illustrates a block diagram of some example components, used in generating an estimation of a tool state, which can be used to generate instruction sources for manual and/or automated battery disassembly.

FIG. 6 illustrates a block diagram 600 of an overview of example sources and techniques for generating the task primitive dataset 504. Example sources as described herein can include manual disassembly sources 602, autonomous disassembly sources 604, modeling or simulation sources 606, and manual annotation sources 608. These sources are provided as examples. Not every source is required in every implementation, and other sources of generating the task primitives can also be added. Furthermore, the sources can be combined. Manual disassembly sources 602 can include recording motions of a human technician, one or more tools, and the ABDS sensor outputs and parameters, during one or more manual disassembly tasks performed by the human technician, using the tools. Autonomous disassembly sources 604 can include recorded ABDS data, for example, data from high-level and/or low-level components, collected during performances of prior autonomous disassembly tasks. Modeling or simulation sources 606 can include generating task primitive data from one or more software models and/or simulation, for example, using modeling or simulation techniques similar to the techniques used when generating cutting toolpaths in computerized numerical control (CNC) manufacturing applications. Manual annotation sources 608 includes annotating a task primitive or a series of task primitives with milestones for success and failure, and/or other data.

The task primitive dataset 504 can be continuously updated, or tuned using the resources 602-608, or other resources. Some parameters used for tuning can include, task primitive execution time, success/failure rate, degree of tool wear, quantified risk of damage to the battery when performing a task primitive, or a series of tasks primitives, and other parameters.

FIG. 7 illustrates a block diagram 700 of some example components, used in generating an estimation of a tool state, which, in turn, can be used to generate the manual disassembly sources 602 and/or autonomous disassembly sources 604. A tool perception suite 702 can provide a plurality of sensor readings to a sensor fusion module 714. For example, the tool perception suite 702 can include onboard vision cameras 704, coupled with or mounted on the tool, proximity, or range sensors 706, environmental motion tracking sensors 708, and inertial measurement units 710. Some sensors and components of the tool state perception suite 702 are onboard sensors coupled with or mounted on the tool, and some sensors are offboard or environmental, mounted on locations outside the tool. The combination of the onboard and offboard sensor outputs can be used to generate and/or track a state of a tool during manual or autonomous performance of a task primitive. Exploratory probing motions module 712 can provide additional sensor output to assist in estimating and/or tracking a tool state throughout the performance of a task primitive. While the accuracy of motion trajectories can initially rely on no-contact vision systems, the accuracy can be improved through further exploratory motions using inputs from additional sensors, such as rangefinder sensors (e.g., infrared rangefinders), or proximity switches. In some embodiments, when some sensors are mounted to motion platforms 106, they can be better positioned in their optimal operating ranges. In the case of contact/proximity switches, the motion platforms 106 can perform move-to-contact procedures and leverage a physical contact as a positional reference.

The sensor fusion module 714 can combine the sensor readings from the tool perception suite and the exploratory probing motions 712 to generate the tool state estimation 716. In some embodiments, the tool and/or the tool environment can include physical or virtual reality markers to provide reference or orientation points for interpreting sensor data, and for generating the tool state estimation 716. The sensor fusion module 714 can use virtual reality and filmmaking motion capture techniques.

Figure 8:
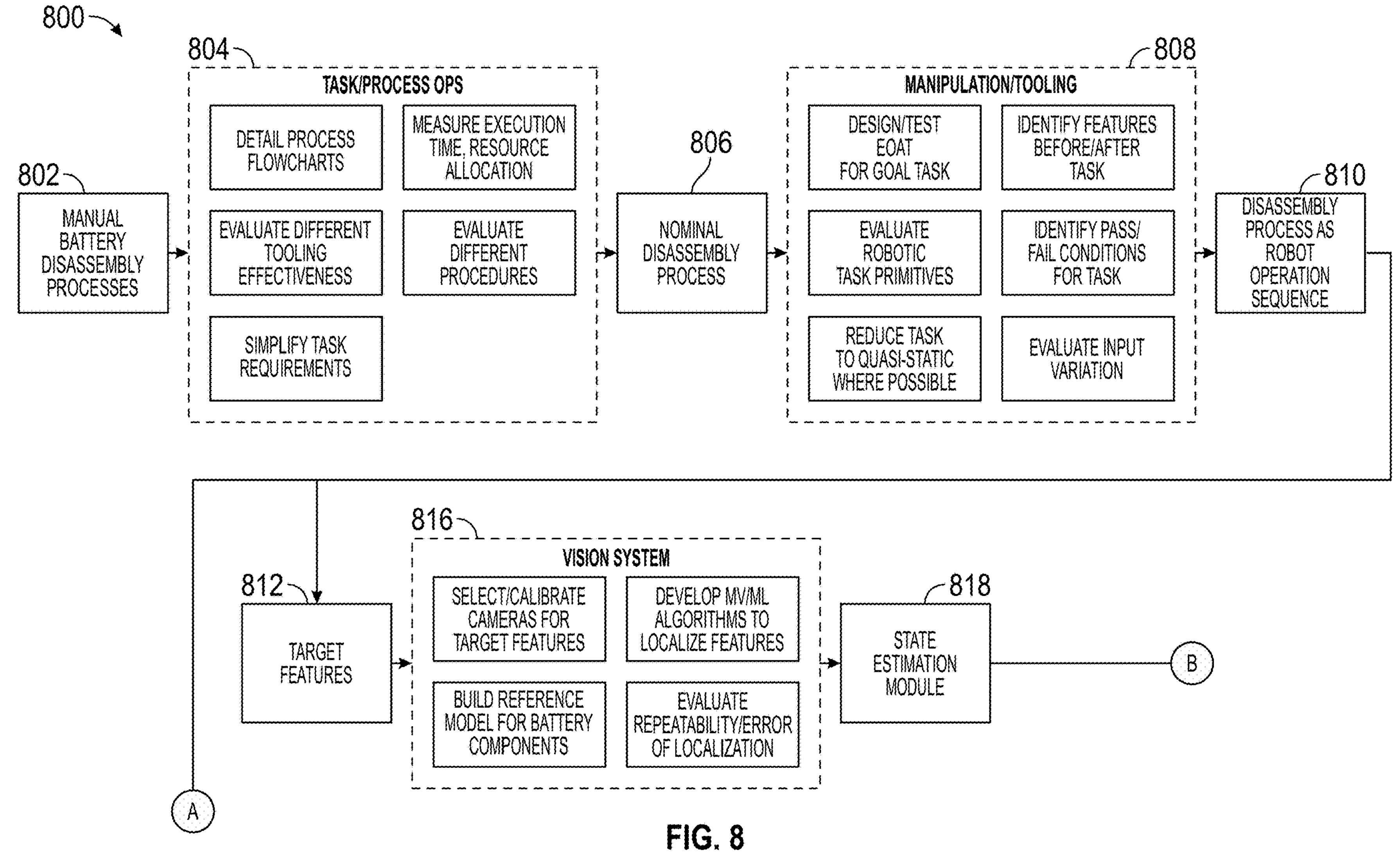
FIG. 8 illustrates a block diagram of example process steps for generating robotic task primitives, from manual battery disassembly processes.
Figure 8:
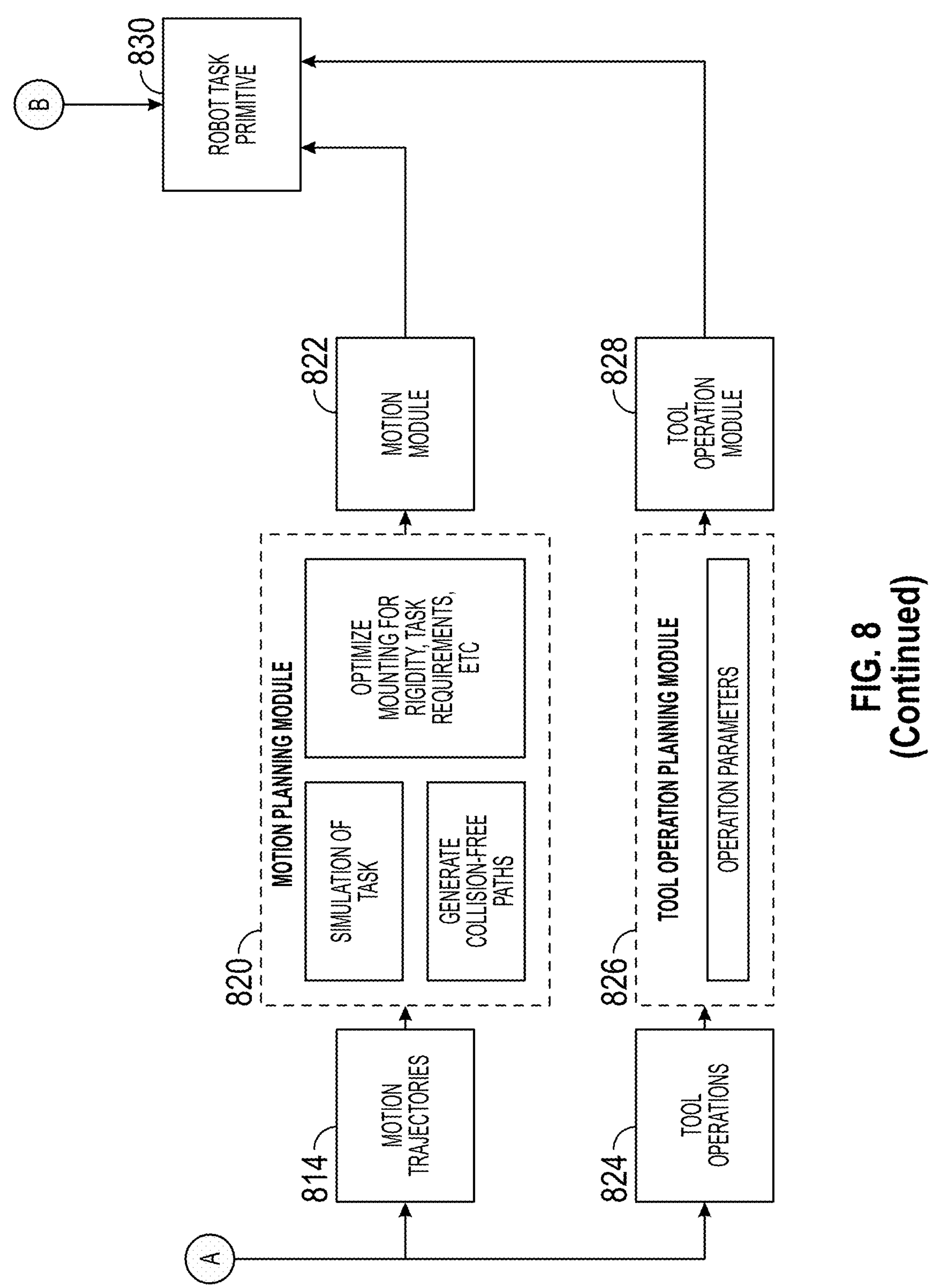

FIG. 8 illustrates a block diagram 800 of example process steps to generate robotic task primitives, from manual battery disassembly processes. In some embodiments, manual battery disassembly processes 802 can be used to generate task/process operations 804. Task/process operations 804 can include synthesizing, gathering, or generating information such as detailed process flowcharts, execution time measurements, allocation or assignment of resources, evaluation of effectiveness of various tooling relative to a task, and information or processes for task simplification. Task/process operations 804 can be used to generate preliminary or nominal disassembly processes 806.

The manipulation/tooling stage 808 can receive the nominal disassembly processes 806, as a starting point, and design and/or test an end of arm tool (EOAT) for a disassembly goal or task. The manipulation/tooling stage 808 operations can further include identifying target features and/or state of target features both before and after successful completion of a task, identifying evaluation parameters of a robotic task primitive, identifying passing, and failing conditions for a task, where possible reducing tasks to quasi-static tasks, and evaluating input variation. Performing the operations of the manipulation/tooling stage 808 can yield a disassembly process as a robotic operation sequence 810.

The robotic operation sequence 810 can yield target features 812, the motion trajectories 814 and tool operations 824. The target features 812 can include battery features that are subjects of disassembly tasks, their location, and their state before and after performance of a disassembly task. The motion trajectories 814 can also include poses or states of tools and/or robotic agents coupled with the tools. The target features 812 can be the subject of operations of a vision system 816. The operations of the vision system 816 can include selection and/or calibration of cameras for the target features, developing, and/or configuring machine vision and/or machine learning modules directed to detecting and localizing the target features. Localizing in this context refers to estimating or determining the location of a target feature, relative to a reference. Additional operations of the vision system 816 includes building reference visual models for various battery types and the battery components in each battery type and developing parameters or framework for evaluating repeatability of a target feature localization algorithm, as well as any expected error margin for a localization algorithm. The operations of the vision system 816 can be used to build a state estimation module 818. The state estimation module 818 can identify target features and determine or estimate their locations within a known margin of error.

The motion trajectories 814 can be the subject of operations of a motion planning module 820. Some example operations of the motion planning module 820 can include, simulating the performance of a disassembly task, generating collision-free paths to move a robotic agent to a target feature, and various optimization, such as mounting optimization for rigidity and/or improved task performance. The output of the motion planning module 820 can be used to build a motion module 822. The motion module 822 can include the motion trajectories of a disassembly task, including for example, the motions to move a robotic agent armed with a tool to a target feature on a battery, and the motion trajectories of the tool during operation or performance of the disassembly task on the target feature.

The tool operations 824 can include data, such as type and selection of the tools, sub-tools, accessories, and tool operation requirements for performance of a disassembly task. The tool operations 824 can be the subject of a tool operations planning module 826. The tool operation planning module 826 generates tool operation parameters, depending on the type of tool and the requirements of the disassembly task. Tool operation parameters can be constrained by both the requirements of the disassembly task and by safety parameters. In other words, tool operation parameters can include parameters to perform a disassembly task and parameters to monitor for safety purposes, such as avoiding thermal runaway and unsafe currents and voltages at various surfaces of the battery. The output of the tool operation planning module 826 can be used to build a tool operations module 828. The tool operations module 828 can provide the tool selection, and the tool operating parameters for a task primitive. The state estimation module 818, the motion module 822 and the tool operations module 828 can be used to build the robotic task primitives 830.

The task planner 406 and/or the task primitive execution module 408 can be configured to account in variation in their inputs and modify either the task primitives or a sequence of task primitives to accomplish a disassembly task. Variation in input refers to real-world changes that can exist between the parameters of a battery, or battery feature, relative to the parameters and conditions that are stored for a task primitive, or a series of task primitives. If deviation between observed parameters and stored parameters for a task primitive are minimal, the task primitive can be executed, without modification. If the observed parameters differ, the task primitive, or a series of task primitives can be modified. An example of the modification can include rerunning a task primitive (e.g., a task primitive directed to "cutting"), until the objective of the task primitive is achieved.

Figure 9:
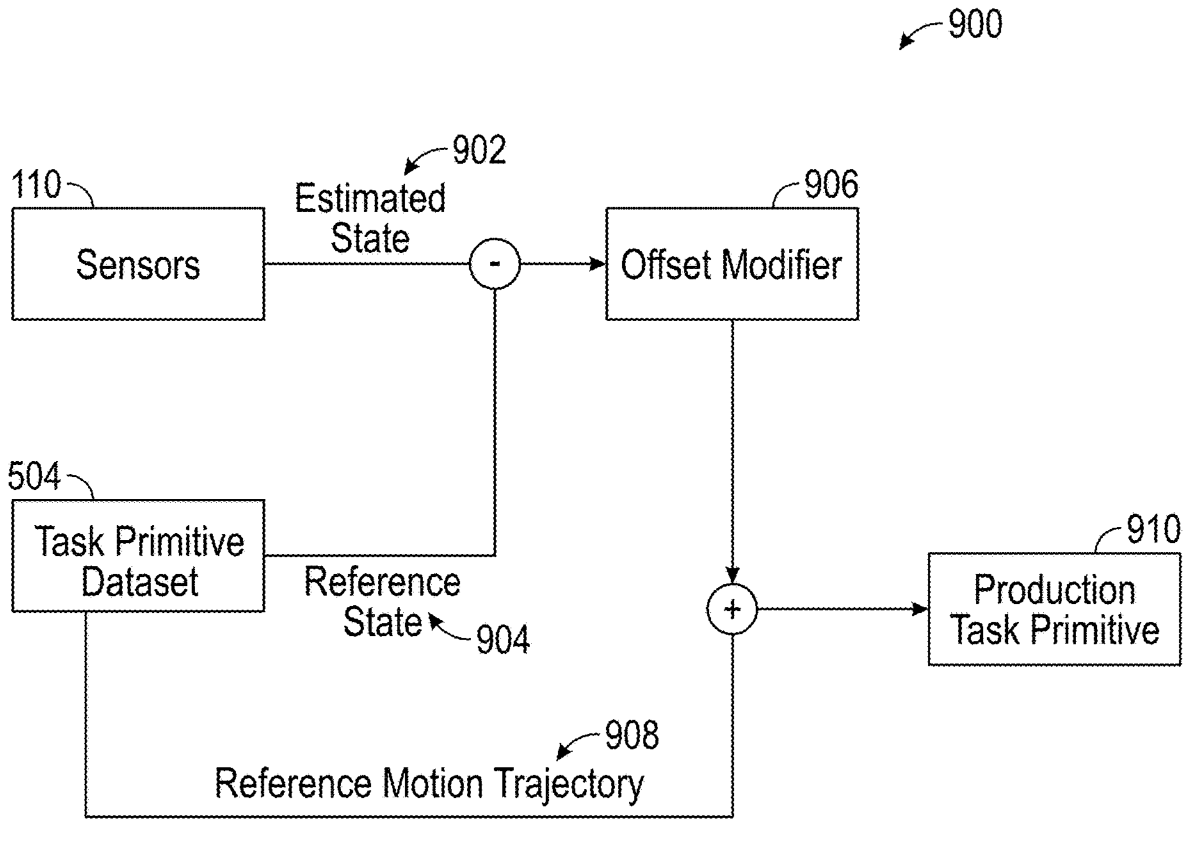
FIG. 9 is a block diagram of an example of the operations of a task planner, when modifying a reference task primitive.

FIG. 9 is a block diagram 900 of an example of the operations of the task planner, when modifying a reference task primitive. The task primitive dataset 504 can provide the reference task primitives. Each task primitive can include expected conditions and parameters of the task, tooling, and motion trajectories of the task primitive. In other words, a task primitive includes the "reference state," under which the task primitive is expected to perform. As described earlier, the reference state and the associated parameters can be generated or obtained when building the task primitive dataset 504. Subsequent batteries, of even the same type, can have variations in parameters and conditions that can affect the performance of the task primitive. These variations can be on a spectrum, minimal or substantial. For example, not every battery feature, subject of a task primitive, is affixed to the battery structure, without movement. Some fasteners, holding harnessing, for example, can have a range of free motion.

In some cases, the location of an expected feature for a task primitive can be part of the variation between a task primitive, stored in the task primitive dataset 504, and a battery being disassembled. In this scenario, the sensors 110 can be queried to build an estimated state 902. The task primitive dataset 504 can be polled to retrieve a reference state 904. The difference between the estimated state 902 and the reference state 904 can yield an offset modifier 906. The task primitive dataset 504 and/or the reference state 904 can be used to retrieve a reference motion trajectory 908. Combining the reference motion trajectory 908 with the offset modifier 906 can yield a production task primitive 910. The same framework illustrated in the diagram 900 can be applied to determining other modifications to the task primitives, based on detecting the output of the sensors 110 and comparing the observed sensor outputs to the reference task primitives.

Hardware Architecture

Several possible combinations of motion systems and tooling to position/maneuver tooling around an EV battery can be used. Example hardware architectures can include static manipulator arms, static manipulator arms and mobile battery station, overhead gantry system, mobile manipulator arms on motion extenders, complex tooling/gantry on single large robotic arms, and others. In some embodiments, robot manipulators, mounted statically around a battery pack workspace can be used. In another embodiment, robot manipulators, mounted on a rail and/or a gantry for increased workspace can be used. In some embodiments, a gantry system for increased rigidity and payload can be used. In some embodiments, winch systems, for lifting heavy payloads, can be used. The winch systems can include attachment points guided and affixed with assistance from a secondary robotic arm. In some embodiments, a combination of industrial robot arms can be used for larger payloads and heavy-duty, high-force tasks, while cobots can be used for less demanding tasks.

Tooling can be operated at some selected pose relative to a target feature on the battery. This does not necessarily require that tooling is moved to a target feature with an anthropomorphic, serial-chain manipulator, nor does it require the tooling to be moved at all. In some embodiments, the target battery feature can be moved to the tooling. Motion systems, such as serial-chain manipulators can be generalized positioning systems that can be characterized by reach, payload, rigidity, and resolution. Reach and payload can be correlated, but rigidity and resolution can vary across the system workspace. Selection of the motion system can determine whether tooling can be adequately deployed for a target task. Selection of the motion system can in turn be informed by requirements of assembly tasks embedded in the task primitives. High-payload tasks, such as extracting heavy battery modules and detaching subcomponents that may be partially affixed to the main battery structure with adhesives, can be performed with corresponding heavy-duty motion systems. Task primitives, embedding dexterous, precision disassembly tasks, such as decoupling small connectors, or removing fasteners, can be performed by more light-duty motion systems.

An example disassembly workspace can include several robotic arm manipulators, statically affixed around a battery. The manipulators may be affixed to the ground, or to an overhead mounting point, relative to the battery. They can include fixed tooling, or they can utilize a tool changer to swap tooling from a cache of tools. A fixed manipulator may not necessarily be able to fully access all sections of a battery. This scenario can be addressed by the addition of more manipulators or conveyance mechanisms beneath the battery or manipulator arms. The addition of motion extenders, which can be on a mobile base, or on additional motion axes, supporting one or more manipulator arms, having multiple degrees of freedom (DOF) can decouple the payload and reach relationships, where used. Alternatively, an inverse configuration, where advanced tooling integrating precision motion axes for dexterous tasks are mounted to a large manipulator, can increase the likelihood that a base arm manipulator can support high payload tasks and gross motions, while the tooling with redundant motion axes can separately handle the fine-positioning motions and task involving fine positioning.

SOME ADVANTAGES OF THE EMBODIMENTS

Robotics and automation excel in the timing, speed, precision, and repeatability of executing disassembly tasks. Furthermore, automating a battery disassembly task through robotics can allow for more efficient solutions in battery disassembly when compared to the manual procedures. Destructive dismantling may be more viable, as heavier tooling can be utilized, and there could be less concern regarding potential damage, as the cutting paths can be more tightly controlled position-wise. Without a human technician in-the-loop, the discharge step in battery disassembly can be delayed or skipped altogether, as ensuring high voltage safety is less of a concern. This can allow for more efficient determination of SOH, because the discharge process, when using autonomous disassembly can occur at other times during the disassembly, compared to having to be performed relatively early in the process, when human technicians are performing manual disassembly. This can substantially increase the efficiency of battery SOH analysis in parallel with increasing the efficiency and safety of the disassembly.

Furthermore, scaling up the machinery size can also allow for performing operations that otherwise would require the coordination of multiple technicians, for example when lifting large covers or heavy modules. Similarly, high parallelizable tasks, such as fastener removal, can leverage a robotic system's relatively faster speeds or a non-anthropomorphic configuration of multiple manipulator arms to expedite performing of the task.

In some cases, the ABDS can utilize tools that are more suited to performing a disassembly task that a human technician may not be able to use during manual disassembly operation, due to safety concerns, or when the tool may be too heavy or difficult for a human technician to operate throughout a typical disassembly workday. For example, larger cutting tools can be difficult for human technicians to use on a routine basis, while they can be more suited for avoiding stripped fasteners or for performing intensive destructive disassembly. Other tools, such as waterjets, high-powered lasers, endmills and angle grinders may be more suitable tools for accomplishing a disassembly task, but unsafe or inefficient for manual disassembly.

Another advantage of autonomous battery disassembly is the live or continuous safety monitoring, as described in relation to the feature of the safety monitor 432. Such monitoring can better detect unsafe conditions and more efficiently respond to unsafe conditions. For example, the ABDS can detect unsafe thermal runaway temperatures in time for implementing remedial measures. Autonomous battery disassembly systems can also be implemented to provide a safe physical distance between the system components and any human technician working in the same environment. For example, human technicians monitoring the ABDS can rely on the HMI 404 to increase their physical distance from the battery.

Other advantages of autonomous battery disassembly include reduction of assembly mistakes that can occur, when multitude of battery types can each have different disassembly procedures, without availability of documentation to provide disassembly guidance. Furthermore, the ABDS, operated over time, can generate a knowledge database of more precise disassembly instructions for a more comprehensive collection of battery types, as well as using the knowledge database, and the recordation and evaluation of prior disassembly jobs to further improve and tune the disassembly instructions in the knowledge database.

Other advantages of autonomous battery disassembly can be envisioned by persons of ordinary skill in the art, given the benefit of the described embodiments.

Example Implementation Mechanism-Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 10:
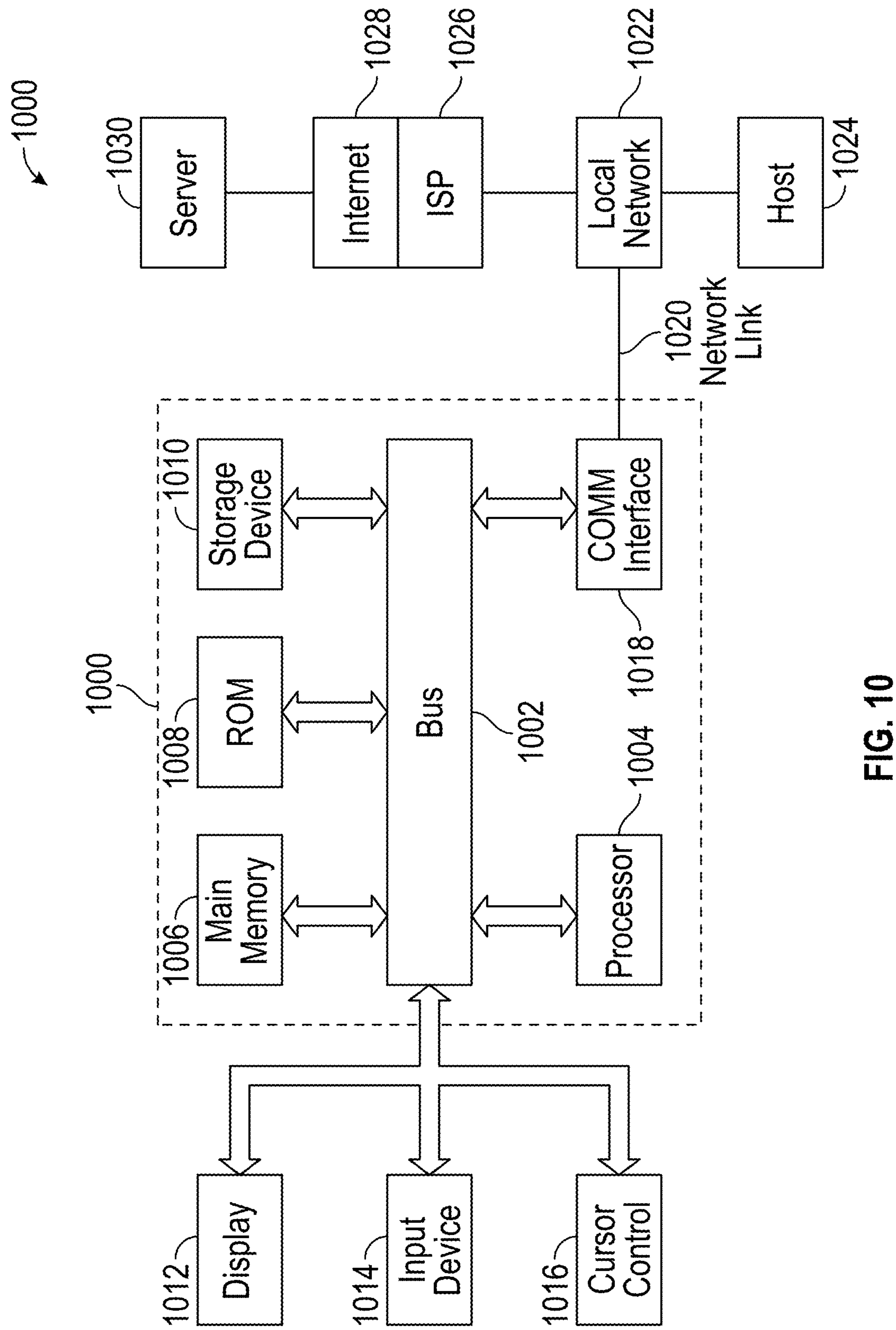
FIG. 10 illustrates an environment in which some embodiments may operate.

For example, FIG. 10 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method of autonomous battery disassembly comprising: securing the battery in a disassembly workstation; identifying a battery type, with a computer system, receiving imagery inputs from one or more vision systems, wherein the computer system compares the received imagery inputs against a database of images of battery features; retrieving a disassembly instruction set corresponding to the battery type, the disassembly instructions comprising a sequence of task primitives, each task primitive comprising a tool, one or more robot motion trajectories, relative to a feature on the battery and a disassembly task performable by the tool; receiving location estimation inputs from the one or more vision systems, the location estimation inputs comprising coordinate data, and depth data relative to a reference point; detecting a location of the battery and the battery features, relative to one or more robotic agents, based at least in part on the received location estimation inputs from the vision systems, wherein each robotic agent is coupled to or is capable of being coupled to one or more tools; selecting a robotic agent and a tool associated with a task primitive; performing the robotic motion trajectories, comprising the selected robotic agent coupled with a tool associated with the task primitive, moving the robotic agent and the tool to a feature corresponding to the task primitive; and operating the tool on the feature, comprising deploying the tool and performing the disassembly task associated with the task primitive.

Example 2: The method of Example 1, further comprising: generating a task primitive, comprising: attaching one or more motion capture sensors to the tools and/or one or more body parts of a human technician operating the tools; recording output of the sensors, when the tools are operated by the human technician performing a disassembly task associated with a task primitive on a feature of the battery; and generating the task primitive, at least in part, based on the recorded sensor output.

Example 3: The method of some or all of Examples 1 and 2, further comprising: generating the disassembly instruction set, based on output of sensors attached to the tools and/or body parts of a human technician; annotating the sensor outputs with disassembly milestones; during, before and/or after performance of a task primitive, receiving an input from the one or more vision systems; and detecting success or failure of the performance of the task primitive, based at least in part on comparing the received input from the one or more vision systems with the milestones.

Example 4: The method of some or all of Examples 1-3, further comprising: generating a task primitive, based at least in part on software simulation of a battery disassembly.

Example 5: The method of some or all of Examples 1-4, wherein the disassembly instruction set and/or the task primitives are updated based on a one or more of previously performed battery disassembly.

Example 6: The method of some or all of Examples 1-5, wherein the disassembly tasks comprise one or more acts comprising one or more of discharging one or more cells of the battery, discharging one or more modules of the battery, removing a battery housing cover, disconnecting or severing wiring between the battery cells and/or the battery modules, determining a state of health (SOH) of one or more cells of the battery, and/or one or more modules of the battery.

Example 7: The method of some or all of Examples 1-6, further comprising: monitoring one or more of battery temperature, presence of a person in vicinity of or in path of a robot motion trajectory, success or failure of the performance of the disassembly task; and generating a notification, at least in part, based on the monitoring.

Example 8: The method of some or all of Examples 1-7, further comprising: receiving depth data from a sensor, wherein detecting the location of the battery and the battery features are based at least in part on the received depth data.

Example 9: The method of some or all of Examples 1-8, further comprising: determining a reference state of the battery, from a motion trajectory of a task primitive, stored in a task primitive dataset; generating an estimated current state of the battery, based at least in part on the inputs from the one or more vision systems; generating one or more offset modifiers, comprising a difference between the reference state and the estimated current state of the battery; and regenerating the task primitive, by combining the offset modifier with the reference motion trajectory.

Example 10: The method of some or all of Examples 1-9, wherein the robotic comprises one or more of a static or mobile manipulator arm, an overhead gantry system, relative to the battery, motion extenders, and a winch system.

Example 11: A non-transitory computer storage that stores executable program instructions that, when executed by one or more computing devices, configure the one or more computing devices to perform or to cause to perform operations comprising: securing the battery in a disassembly workstation; identifying a battery type, with a computer system, receiving imagery inputs from one or more vision systems, wherein the computer system compares the received imagery inputs against a database of images of battery features; retrieving a disassembly instruction set corresponding to the battery type, the disassembly instructions comprising a sequence of task primitives, each task primitive comprising a tool, one or more robot motion trajectories, relative to a feature on the battery and a disassembly task performable by the tool; receiving location estimation inputs from the one or more vision systems, the location estimation inputs comprising coordinate data, and depth data relative to a reference point; detecting a location of the battery and the battery features, relative to one or more robotic agents, based at least in part on the received location estimation inputs from the vision systems, wherein each robotic agent is coupled to or is capable of being coupled to one or more tools; selecting a robotic agent and a tool associated with a task primitive; performing the robotic motion trajectories, comprising the selected robotic agent coupled with a tool associated with the task primitive, moving the robotic agent and the tool to a feature corresponding to the task primitive; and operating the tool on the feature, comprising deploying the tool and performing the disassembly task associated with the task primitive.

Example 12: The non-transitory computer storage of Example 11, wherein the operations further comprise: generating a task primitive, comprising: attaching one or more motion capture sensors to the tools and/or one or more body parts of a human technician operating the tools; recording output of the sensors, when the tools are operated by the human technician performing a disassembly task associated with a task primitive on a feature of the battery; and generating the task primitive, at least in part, based on the recorded sensor output.

Example 13: The non-transitory computer storage of some or all of Examples 11, and 12, wherein the operations further comprise: generating the disassembly instruction set, based on output of sensors attached to the tools and/or body parts of a human technician; annotating the sensor outputs with disassembly milestones; during, before and/or after performance of a task primitive, receiving an input from the one or more vision systems; and detecting success or failure of the performance of the task primitive, based at least in part on comparing the received input from the one or more vision systems with the milestones.

Example 14: The non-transitory computer storage of some or all of Examples 11-13, wherein the operations further comprise: generating a task primitive, based at least in part on software simulation of a battery disassembly.

Example 15: The non-transitory computer storage of some or all of Examples 11-14, wherein the disassembly instruction set and/or the task primitives are updated based on a one or more of previously performed battery disassembly.

Example 16: The non-transitory computer storage of some or all of Examples 11-15, wherein the disassembly tasks comprise one or more acts comprising one or more of discharging one or more cells of the battery, discharging one or more modules of the battery, removing a battery housing cover, disconnecting or severing wiring between the battery cells and/or the battery modules, determining a state of health (SOH) of one or more cells of the battery, and/or one or more modules of the battery.

Example 17: The non-transitory computer storage of some or all of Examples 11-16, wherein the operations further comprise: monitoring one or more of battery temperature, presence of a person in vicinity of or in path of a robot motion trajectory, success or failure of the performance of the disassembly task; and generating a notification, at least in part, based on the monitoring.

Example 18: The non-transitory computer storage of some or all of Examples 11-17, wherein the operations further comprise: receiving depth data from a sensor, wherein detecting the location of the battery and the battery features are based at least in part on the received depth data.

Example 19: The non-transitory computer storage of some or all of Examples 11-16, wherein the operations further comprise: determining a reference state of the battery, from a motion trajectory of a task primitive, stored in a task primitive dataset; generating an estimated current state of the battery, based at least in part on the inputs from the one or more vision systems; generating one or more offset modifiers, comprising a difference between the reference state and the estimated current state of the battery; and regenerating the task primitive, by combining the offset modifier with the reference motion trajectory.

Example 20: The non-transitory computer storage of some or all of Examples 11-19, wherein the robotic comprises one or more of a static or mobile manipulator arm, an overhead gantry system, relative to the battery, motion extenders, and a winch system.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method of autonomous battery disassembly comprising:

securing the battery in a disassembly workstation;

identifying a battery type, with a computer system, receiving imagery inputs from one or more vision systems, wherein the computer system compares the received imagery inputs against a database of images of battery features;

retrieving a disassembly instruction set corresponding to the battery type, the disassembly instructions comprising a sequence of task primitives, each task primitive comprising a tool, one or more robot motion trajectories, relative to a feature on the battery and a disassembly task performable by the tool;

receiving location estimation inputs from the one or more vision systems, the location estimation inputs comprising coordinate data, and depth data relative to a reference point;

detecting a location of the battery and the battery features, relative to one or more robotic agents, based at least in part on the received location estimation inputs from the vision systems, wherein each robotic agent is coupled to or is capable of being coupled to one or more tools;

selecting a robotic agent and a tool associated with a task primitive;

performing the robotic motion trajectories, comprising the selected robotic agent coupled with a tool associated with the task primitive, moving the robotic agent and the tool to a feature corresponding to the task primitive; and operating the tool on the feature, comprising deploying the tool and performing the disassembly task associated with the task primitive.

2. The method of claim 1, further comprising: generating a task primitive, comprising:

attaching one or more motion capture sensors to the tools and/or one or more body parts of a human technician operating the tools;

recording output of the sensors, when the tools are operated by the human technician performing a disassembly task associated with a task primitive on a feature of the battery; and generating the task primitive, at least in part, based on the recorded sensor output.

3. The method of claim 1, further comprising:

generating the disassembly instruction set, based on output of sensors attached to the tools and/or body parts of a human technician;

annotating the sensor outputs with disassembly milestones;

during, before and/or after performance of a task primitive, receiving an input from the one or more vision systems; and detecting success or failure of the performance of the task primitive, based at least in part on comparing the received input from the one or more vision systems with the milestones.

4. The method of claim 1, further comprising: generating a task primitive, based at least in part on software simulation of a battery disassembly.

5. The method of claim 1, wherein the disassembly instruction set and/or the task primitives are updated based on a one or more of previously performed battery disassembly.

6. The method of claim 1, wherein the disassembly tasks comprise one or more acts comprising one or more of discharging one or more cells of the battery, discharging one or more modules of the battery, removing a battery housing cover, disconnecting or severing wiring between the battery cells and/or the battery modules, determining a state of health (SOH) of one or more cells of the battery, and/or one or more modules of the battery.

7. The method of claim 1, further comprising:

monitoring one or more of battery temperature, presence of a person in vicinity of or in path of a robot motion trajectory, success or failure of the performance of the disassembly task; and generating a notification, at least in part, based on the monitoring.

8. The method of claim 1, further comprising:

receiving depth data from a sensor, wherein detecting the location of the battery and the battery features are based at least in part on the received depth data.

9. The method of claim 1, further comprising:

determining a reference state of the battery, from a motion trajectory of a task primitive, stored in a task primitive dataset;

generating an estimated current state of the battery, based at least in part on the inputs from the one or more vision systems;

generating one or more offset modifiers, comprising a difference between the reference state and the estimated current state of the battery; and regenerating the task primitive, by combining the offset modifier with the reference motion trajectory.

10. The method of claim 1, wherein the robotic comprises one or more of a static or mobile manipulator arm, an overhead gantry system, relative to the battery, motion extenders, and a winch system.

11. A non-transitory computer storage that stores executable program instructions that, when executed by one or more computing devices, configure the one or more computing devices to perform or to cause to perform operations comprising:

securing the battery in a disassembly workstation;

identifying a battery type, with a computer system, receiving imagery inputs from one or more vision systems, wherein the computer system compares the received imagery inputs against a database of images of battery features;

retrieving a disassembly instruction set corresponding to the battery type, the disassembly instructions comprising a sequence of task primitives, each task primitive comprising a tool, one or more robot motion trajectories, relative to a feature on the battery and a disassembly task performable by the tool;

receiving location estimation inputs from the one or more vision systems, the location estimation inputs comprising coordinate data, and depth data relative to a reference point;

detecting a location of the battery and the battery features, relative to one or more robotic agents, based at least in part on the received location estimation inputs from the vision systems, wherein each robotic agent is coupled to or is capable of being coupled to one or more tools;

selecting a robotic agent and a tool associated with a task primitive;

performing the robotic motion trajectories, comprising the selected robotic agent coupled with a tool associated with the task primitive, moving the robotic agent and the tool to a feature corresponding to the task primitive; and operating the tool on the feature, comprising deploying the tool and performing the disassembly task associated with the task primitive.

12. The non-transitory computer storage of claim 11, wherein the operations further comprise: generating a task primitive, comprising:

attaching one or more motion capture sensors to the tools and/or one or more body parts of a human technician operating the tools;

recording output of the sensors, when the tools are operated by the human technician performing a disassembly task associated with a task primitive on a feature of the battery; and generating the task primitive, at least in part, based on the recorded sensor output.

13. The non-transitory computer storage of claim 11, wherein the operations further comprise:

generating the disassembly instruction set, based on output of sensors attached to the tools and/or body parts of a human technician;

annotating the sensor outputs with disassembly milestones;

during, before and/or after performance of a task primitive, receiving an input from the one or more vision systems; and detecting success or failure of the performance of the task primitive, based at least in part on comparing the received input from the one or more vision systems with the milestones.

14. The non-transitory computer storage of claim 11, wherein the operations further comprise: generating a task primitive, based at least in part on software simulation of a battery disassembly.

15. The non-transitory computer storage of claim 11, wherein the disassembly instruction set and/or the task primitives are updated based on a one or more of previously performed battery disassembly.

16. The non-transitory computer storage of claim 11, wherein the disassembly tasks comprise one or more acts comprising one or more of discharging one or more cells of the battery, discharging one or more modules of the battery, removing a battery housing cover, disconnecting or severing wiring between the battery cells and/or the battery modules, determining a state of health (SOH) of one or more cells of the battery, and/or one or more modules of the battery.

17. The non-transitory computer storage of claim 11, wherein the operations further comprise:

monitoring one or more of battery temperature, presence of a person in vicinity of or in path of a robot motion trajectory, success or failure of the performance of the disassembly task; and generating a notification, at least in part, based on the monitoring.

18. The non-transitory computer storage of claim 11, wherein the operations further comprise:

receiving depth data from a sensor, wherein detecting the location of the battery and the battery features are based at least in part on the received depth data.

19. The non-transitory computer storage of claim 11, wherein the operations further comprise:

determining a reference state of the battery, from a motion trajectory of a task primitive, stored in a task primitive dataset;

generating an estimated current state of the battery, based at least in part on the inputs from the one or more vision systems;

generating one or more offset modifiers, comprising a difference between the reference state and the estimated current state of the battery; and regenerating the task primitive, by combining the offset modifier with the reference motion trajectory.

20. The non-transitory computer storage of claim 11, wherein the robotic comprises one or more of a static or mobile manipulator arm, an overhead gantry system, relative to the battery, motion extenders, and a winch system.

* * * * *